Sept. 24, 1968 W. T. WINTRINGHAM 3,403,226

REDUCED BANDWIDTH DUAL MODE ENCODING OF VIDEO SIGNALS

Filed Sept. 30, 1965

4 Sheets-Sheet 1

INVENTOR
W. T. WINTRINGHAM
BY R. O. Nimz
ATTORNEY

RECEIVER

Sept. 24, 1968 W. T. WINTRINGHAM 3,403,226

REDUCED BANDWIDTH DUAL MODE ENCODING OF VIDEO SIGNALS

Filed Sept. 30, 1965 4 Sheets-Sheet 3

United States Patent Office 3,403,226
Patented Sept. 24, 1968

3,403,226

REDUCED BANDWIDTH DUAL MODE ENCODING OF VIDEO SIGNALS

William T. Wintringham, Chatham, N.J., assignor to Bell Telephone Laboratories, Incorporated, New York, N.Y., a corporation of New York Filed Sept. 30, 1965, Ser. No. 491,780
15 Claims. (Cl. 179—15.55)

ABSTRACT OF THE DISCLOSURE

A television transmission system using both full scale and differential PCM encoding of video information is disclosed. For each frame, the video sample differing the most from adjacent samples is determined and encoded using full scale PCM. The differences between the remaining samples in the frame are encoded using reduced scale differential PCM. The encoded information is then transmitted along with information identifying the position of sample encoded in full scale PCM in the frame.

This invention relates to pulse code communication systems and, more particularly, to the transmission of pulse-coded signal information at reduced bandwidths.

A great number of schemes have heretofore been proposed for reducing the bandwidth required to transmit video information. Among these there is a system known as differential encoding in which the differences between successive samples, rather than the samples themselves, are quantized, encoded and transmitted. Since these differences vary much less, on the average, than do the signal samples themselves, a smaller number of quantizing levels are needed for their accurate representation, and hence a smaller number of digits are used for the transmission of these levels. One such system is disclosed in C. C. Cutler Patent 2,605,361, issued July 24, 1952.

Since a differential encoding scheme such as that described above requires the receiver to reconstruct the signal by summing successive differences, any errors in quantizing, encoding or transmitting these differences are cumulative. In order to prevent excessively large errors from accumulating, it is customary to transmit at regular intervals a more detailed coded representation of a sample amplitude itself, and use this amplitude to correct the accumulated sum at the receiver. One such system is shown in E. R. Kretzmer Patent 2,949,505, issued Aug. 16, 1960.

When transmitting video information, a further disadvantage of differential encoding schemes arises. As is well known, an important part of the picture information is the edges of objects appearing in the picture. These edges are subjectively essential to a proper interpretation of the picture and, moreover, represent comparatively large amplitude discontinuities in the intensity samples of the picture. Since differential encoding inherently has less amplitude discrimination capabilities than conventional pulse-code-modulation, these edges present an especially difficult coding problem. The differential encoder usually requires more than one code to encompass the large amplitude differential. As a result, the edges of the reproduced picture are blurred and, even worse, successive lines do not register and "broken contours" or "edge twinkle" are produced. These effects are very noticeable on a subjective level. Several schemes for transmitting additional edge information are found in R. E. Graham Patent 3,026,375, issued Mar. 20, 1962, S. C. Kitsopoulos Patent 3,071,727, issued Jan. 1, 1963, F. W. Mounts Patent 3,090,008, issued May 14, 1963, and the copending application of E. F. Brown, Ser. No. 491,528, filed Sept. 30, 1965, and assigned to applicant's assignee.

It is an object of the present invention to reduce the bandwitdth necessary to transmit video information while still retaining sharp edge recognition.

It is a more specific object of the invention to combine differential encoding of video information to save bandwidth and full scale pulse code modulation for sharp reproduction of picture edges.

It is an even more specific object of the present invention to transmit the position of sharp discontinuities in video signals along with a fine grain code of the new amplitude level, and to transmit amplitude differentials for smaller amplitude differences.

In accordance with the present invention, a video signal is sampled at regular intervals and these samples are arranged in successive groups of samples. The differences between each adjacent pair of samples is determined and the greatest difference selected. The sample producing this greatest difference is encoded in a full scale, finely quantized code, for example, eight digits, The position of this sample within the group is also encoded. Finally, the remaining differences are encoded in a coarser grained code, for example, four digits. The full scale code, the differential codes and the position code are then transmitted in a preselected serial format to be decoded and used to reconstruct the picture elements at a remote receiver.

It will be first noted that the cumulated errors of a differential encoding system must be periodically corrected to present excessive amplitude errors. It will also be noted that the differential encoding system can cause large transient errors at sharp intensity changes in the picture signals. The arrangement of the present invention simultaneously provides periodic correction of accumulated errors in the summation of the differential amplitudes and, by placing the full scale codes at the largest sample differences, also prevents large transient errors in the decoded output. In this way, most of the advantages of differential encoding are preserved while the major disadvantages are avoided.

These and other objects and features, the nature of the present invention and its various advantages, will be more readily understood upon consideration of the attached drawings and of the following detailed description of the drawings.

Figure 1:
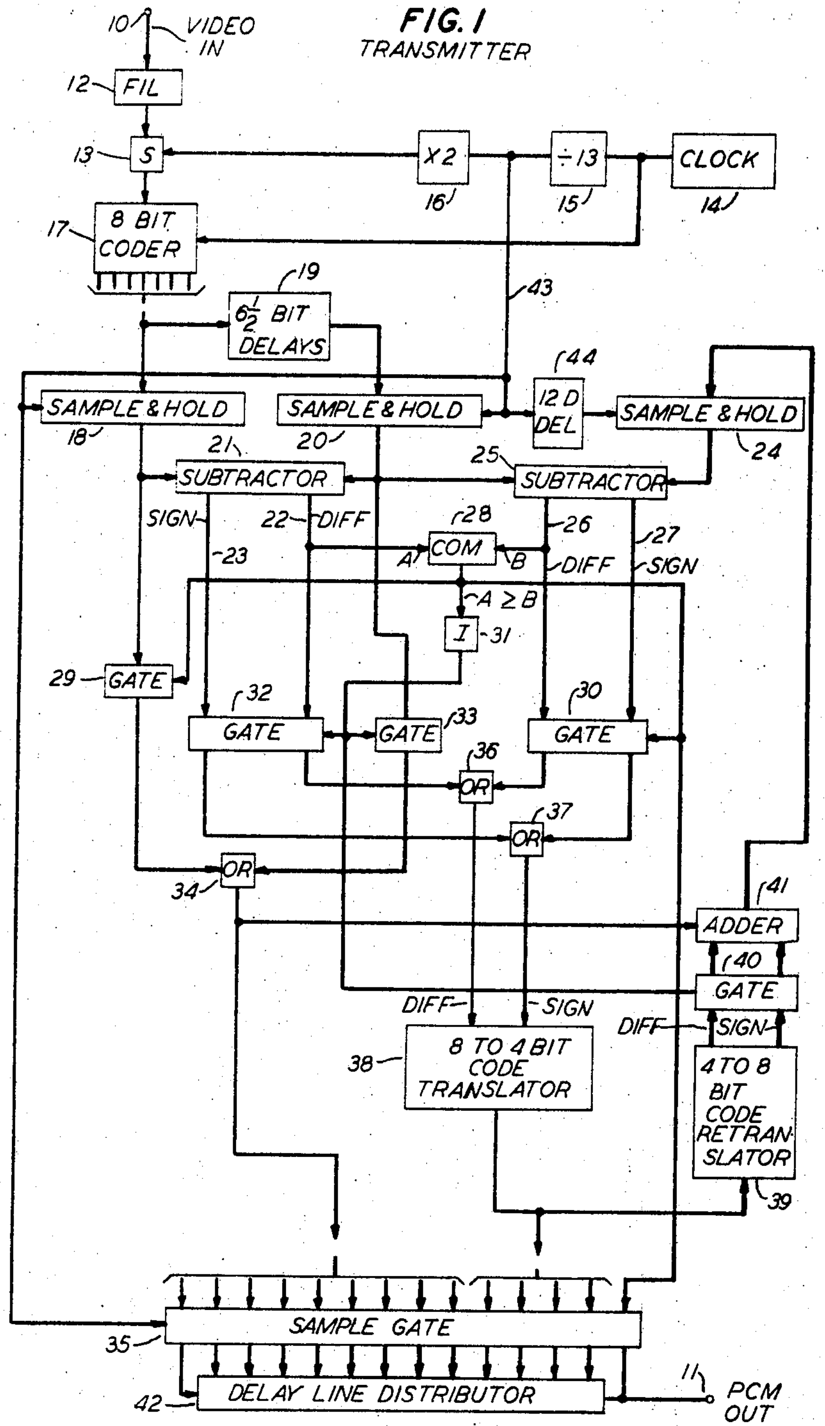
FIG. 1 is a detailed block diagram of a dual mode full scale-differential scale pulse code modulation transmitter in accordance with the present invention.

Referring more particularly to FIG. 1, there is shown a block diagram of a pulse code modulation transmitter according to the present invention. The transmitter of FIG. 1 comprises an input terminal 10, to which analog video signals are applied, and an output terminal 11, from which there are derived a train of pulse coded information representing the analog signal appearing at terminal 10. For simplicity, the illustrative embodiment shown in FIG. 1 divides the samples of video information into sample groups including only two samples in each group. One of these samples is encoded in full scale code while the other is encoded differentially. The full scale code is used for that sample which produces the greatest difference from the previous sample. In this way, the error which is inherent in differential encoding of large differences is avoided while, at the same time, errors which might accumulate from successive differential codes are corrected.

The video signal applied to input terminal 10 is first band-limited by low-pass filter 12 and then applied to sampling circuit 13. Clock pulses derived from clock pulse source 14 are subjected successively to a pulse division in pulse divider circuit 15, and multiplication in multiplier circuit 16, and then are applied to a sampling circuit 13 to enable the sampling of the video signals. These samples are applied to an encoding circuit 17 which, in accordance with well-known techniques, takes each analog sample and converts it into an eight-digit binary code representing the amplitude of that sample. Each eight-digit code from coder 17 is simultaneously applied to a sample and hold circuit 18 and a bank of delay circuits 19. Delay circuits 19 delay each eight-digit code by exactly the intersample interval such that, when a particular eight-digit code appears at sample and hold circuit 20 at the output of delay circuit 19, the immediately succeeding eight-digit code is delivered to sample and hold circuit 18.

Sample and hold circuits 18 and 20 receive the eight-digit codes from encoder 17 and delay circuits 19 and hold these codes for the entire intersample interval. During this time, digital processing takes place in the manner to be described hereinbelow.

The outputs of sample and hold circuits 18 and 20 are applied to subtractor circuit 21 which, in accordance with the techniques well known in the art, derives the digital difference between these two input signals and applies this difference to output lead 22. Simultaneously, the algebraic sign of this difference appears on output lead 23. It will be appreciated that this sign may be positive or negative, depending on which of the two successive codes is greater than the other.

In a manner to be described hereinafter, an eight-digit code representing the amplitude of the immediately preceding sample is applied to sample and hold circuit 24. The outputs of sample and hold circuits 20 and 24 are simultaneously applied to a subtractor circuit 25 which provides the digital difference on output lead 26 and the sign of this difference on output lead 27. It will be appreciated that the differences provided by subtractors 21 and 25 at any particular time represent the difference between the two samples for the current two-sample group (subtractor 21) and the difference between the first sample of the current two-sample group and the last sample of the previous two-sample group (subtractor 25). The absolute magnitude of these two differences, appearing on output leads 22 and 26, respectively, is applied to digital comparing circuit 28. Comparing circuit 28 compares these magnitudes and provides an output pulse when the digital value on lead 22 is equal to or greater than the digital value on lead 26. When the value on lead 22 is less than that on lead 26, no output is produced. This output is applied directly to gating circuits 29 and 30. This output is also inverted in inverting circuit 31 and the inverted output is applied to gating circuits 32 and 33.

It can be seen that gating circuits 29 and 30 simultaneously gate the eight-digit full scale code from sample and hold circuit 18 and the digital difference from subtractor circuit 25 to the output circuits. Alternatively, if the first sample of the two sample group provides the greatest difference, gates 32 and 33 transfer the eight-digit full scale code from sample and hold circuit 20 and the digital difference from subtractor 21 to the ouput circuits.

The outputs of gates 29 and 33 are applied to digital OR circuit 34, the output of which is applied to sample gate 35. The outputs of gates 30 and 32 are similarly applied to digital OR circuits 36 and 37 and the outputs of these OR circuits to translating circuit 38.

It will be noted that, since the codes applied by coding circuit 17 are eight-digit codes, the differences between these eight-digit codes supplied by subtractor circuits 21 and 25 will also be eight-digit codes. The advantages of differential coding, however, lie principally in the ability to adequately represent amplitude differences with a smaller number of digits, i.e., fewer levels of quantization, than are required to adequately represent the amplitude samples themselves. These eight-digit differences, along with the algebraic sign of these differences, are translated in translating circuit 38 into four-digit differential codes. These four-digit codes are simultaneously applied to sampling gate 35 and to retranslating circuit 39.

It will be noted that, if the first sample of the two sample group is transmitted as a full scale eight-digit code and the second sample by means of a differential code, then the first sample of the next two-sample group must be compared with an amplitude representating the last sample of the previous two-sample group. To this end, the differential code from translator 38 is applied to retranslating circuit 39 to be retranslated back to an eight-digit code along with an appropriate sign digit. Under these circumstances, gate circuit 40 is enabled by the output of inverting circuit 31 to apply this eight-digit difference to a digital adding circuit 41. Simultaneously, the output of gate circuit 33 is also applied to adder circuit 41. Adder circuit 41 combines the eight-digit code from OR circuit 34, representing the amplitude of the first sample of the two-sample group, with the retranslated differential code from subtractor circuit 21 to provide an eight-digit representation of the amplitude of the second sample of the two-sample group. This eight-digit code is applied to sample and hold circuit 24 to be utilized as previously described.

If, on the other hand, the second sample of a two-sample group is transmitted as a full scale eight-digit code, this eight-digit code, derived from sample and hold circuit 18 and applied by gating circuit 29 to OR circuit 34, is itself applied directly to adder circuit 41. Gate circuit 40 is not energized and hence nothing is added to this eight-digit code and the code is therefore transferred directly to sample and hold circuit 24.

The output of comparing circuit 28 is an indication of which sample in the two-sample group is to be transmitted by a full scale eight-digit code. If this output is a pulse, the second sample of the two-sample group is transmitted as a full scale eight-digit code. If, on the other hand, the output of comparing circuit 28 is not a pulse, the first sample of the two-sample group is transmitted as a full scale eight-digit code. The output of comparing circuit 28 may therefore be thought of as a one-bit-position code representing the position in the two-sample group of the full scale code. This position bit is likewise applied to sampling gate 35.

Once every two-sample group period, sampling gate 35 is enabled to transfer an eight-digit full scale code, a four-digit differential code and a one-digit position code to delay line distributor 42. These digits are arranged in a thirteen-digit block with the position digit first, the four-digit differential code immediately following the position digit and the eight-digit full scale code at the end. This digit arrangement is preserved regardless of which sample of the two-sample group is transmitted as a full scale code. Delay line distributor 42 translates the parallel digits supplied by sampling gate 35 into a serial pulse train and supplies this pulse train to output terminal 11.

It will be noted that an average of six and one-half bits are required for the transmission of each sample of the input video signal. This can be easily seen when it is realized that each thirteen bit output block represents two successive samples of the input signal. The clock pulse source 14 supplies clock pulses at the output bit rate. These are used in encoder 17. Divider circuit 15, which divides the output of clock pulse source 14 by thirteen, provides on output lead 43 a pulse once for each two-sample group of input samples. This output is used to operate sample and hold circuits 18 and 20, sampling gate 35, and after a twelve-bit delay in delay circuit 44, sample and hold circuit 24. The output of divider circuit 15 is then multiplied by two in multiplying circuit 16. The output of multiplying circuit 16 is applied directly to sampling circuit 13. The twelve-bit delay in delay circuit 44 insures that the eight-digit code held in sample and hold circuit 24 is derived at the end of each two-sample group and held over to be processed with the following two-sample group.

It can be seen that the transmitter of FIG. 1 operates to generate pulse code modulated representations of samples of an input video signal and, moreover, divides these input samples into groups of two successive samples. One sample of each group is transmitted in a full scale eight-digit code while the other sample is transmitted with the aid of a four-digit differential code. The sample represented by the eight-digit full scale code is that sample which produces the greatest difference from the preceding sample while the sample producing the least difference is transmitted by means of a four-digit differential code. In this way, the samples producing the greatest differences are always transmitted as full scale codes to insure accurate representation of these greater differences. Significant band-saving is achieved, however, by transmitting the other sample by means of a differential code with a fewer number of digits. It is necessary, of course, to also transmit with each twelve-digit code group a one-digit position code to identify the position of the eight-digit code.

The signal processing taking place in the transmitter of FIG. 1 is represented as digital signal processing only for purposes of convenience. It is to be understood that this signal processing, i.e., the addition and subtraction, can just as easily be accomplished by means of appropriate analog circuits. In this event, the encoders would be placed near the output of the circuit, following all of this signal processing, rather than immediately after the signal sampling circuit 13.

One example of the codes which might be used in the transmitter of FIG. 1 is shown in tabular form in Table I. As can be seen in Table I, the eight-digit code permits the representation of 256 different discrete levels from zero to 255. The differences between these codes likewise include values between zero and 255 and moreover, may also be positive or negative. These differences are shown in tabular form in Table I. Since the differential code utilizes only four-digits, the same fineness of quantization is not possible with the differential code and hence each differential code represents a range of eight-digit differences. These ranges are shown in Table I.

It will be noted that the ranged represented by successively greater differential codes become successively larger. That is, the differential codes are tapered nonlinearly to provide greater accuracy for the smaller differences and less accuracy for the greater differences. The eight-digit to four-digit differential code translation, of course, takes place in translating circuit 38 in FIG. 1. When retranslating these four-digit codes back into eight-digit codes together with a sign digit, a single eight-digit code must be selected which is representative of the range of values represented by the four-digit code. In Table I this value was selected as the lowest value in each range. This has the advantage of providing extremely simple eight-digit codes shown in the last column of Table I, and thus simplifying the retranslation in circuit 39.

TABLE I

| Analog Diff. | Binary Difference | | 4-Digit Diff. | Retranslation | |
|---|---|---|---|---|---|
| | Sign | 8-Digit Code Diff. | | Sign | 8-Digit Code |
| +255 | 1 | 11111111 | | | |
| . | . | . | 1111 | 1 | 10000000 |
| +128 | 1 | 10000000 | | | |
| +127 | 1 | 01111111 | | | |
| . | . | . | 1110 | 1 | 01000000 |
| +64 | 1 | 01000000 | | | |
| +63 | 1 | 00111111 | | | |
| . | . | . | 1101 | 1 | 00100000 |
| +32 | 1 | 00100000 | | | |
| +31 | 1 | 00011111 | | | |
| . | . | . | 1100 | 1 | 00010000 |
| +16 | 1 | 00010000 | | | |
| +15 | 1 | 00001111 | | | |
| . | . | . | 1011 | 1 | 00001000 |
| +8 | 1 | 00001000 | | | |
| +7 | 1 | 00000111 | | | |
| . | . | . | 1010 | 1 | 00000100 |
| +4 | 1 | 00000100 | | | |
| +3 | 1 | 00000011 | | | |
| +2 | 1 | 00000010 | 1001 | 1 | 00000010 |
| +1 | 1 | 00000001 | | | |
| ±0 | (1, 0) | 00000000 | 0000 | (1, 0) | 00000000 |
| −1 | 0 | 00000001 | | | |
| −2 | 0 | 00000010 | | | |
| −3 | 0 | 00000011 | 0001 | 0 | 00000010 |
| −4 | 0 | 00000100 | | | |
| . | . | . | 0010 | 0 | 00000100 |
| −7 | 0 | 00000111 | | | |
| −8 | 0 | 00001000 | | | |
| . | . | . | 0011 | 0 | 00001000 |
| −15 | 0 | 00001111 | | | |
| −16 | 0 | 00010000 | | | |
| . | . | . | 0100 | 0 | 00010000 |
| −31 | 0 | 00011111 | | | |
| −32 | 0 | 00100000 | | | |
| . | . | . | 0101 | 0 | 00100000 |
| −63 | 0 | 00111111 | | | |
| −64 | 0 | 01000000 | | | |
| . | . | . | 0110 | 0 | 01000000 |
| −127 | 0 | 01111111 | | | |
| −128 | 0 | 10000000 | | | |
| . | . | . | 0111 | 0 | 10000000 |
| −255 | 0 | 11111111 | | | |

Figure 2:
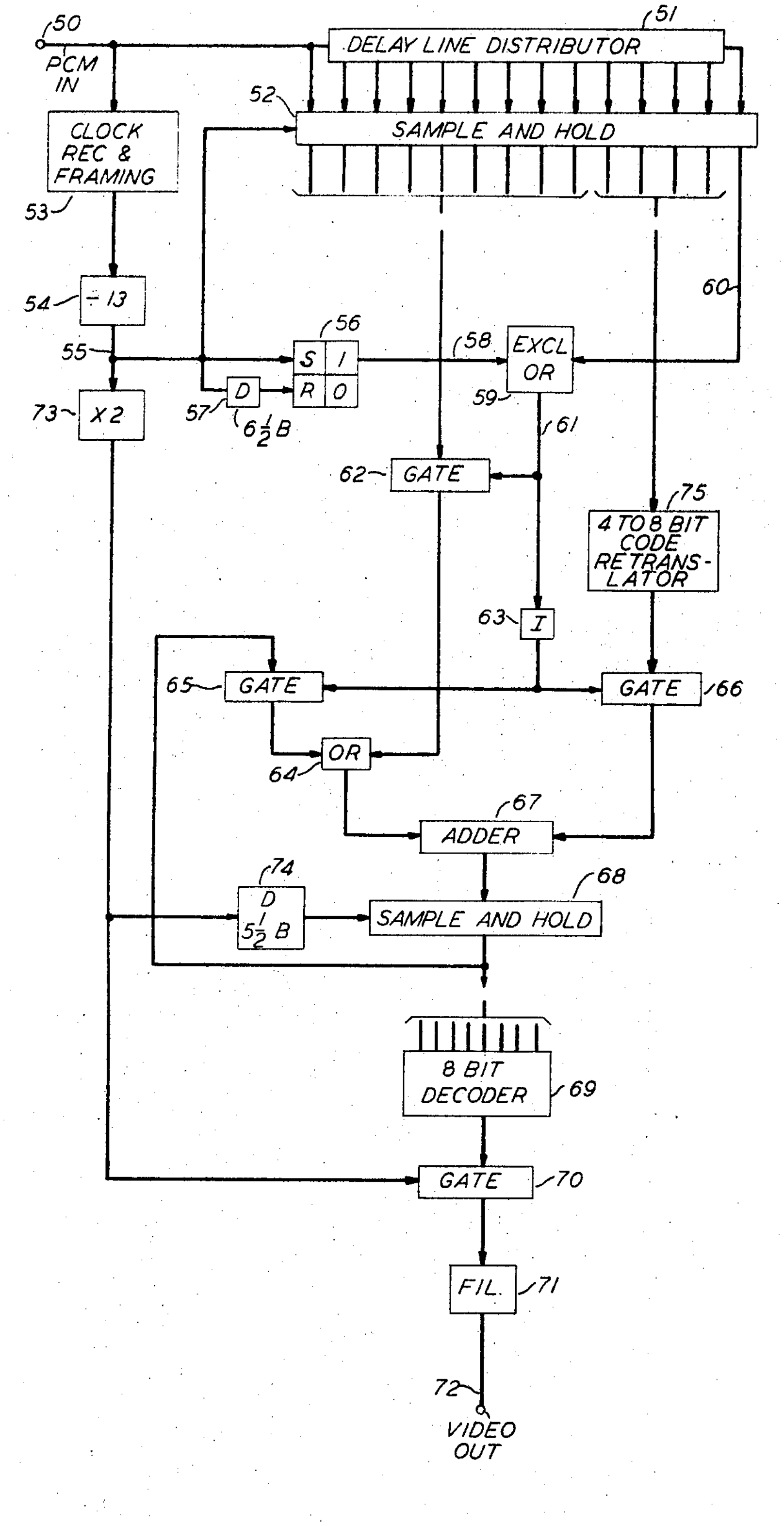
FIG. 2 is a detailed block diagram of a dual mode full scale-differential scale, pulse code modulation receiver in accordance with the present invention and usable with the transmitter of FIG. 1.

Turning then to FIG. 2, there is shown a block diagram of a pulse code modulation receiver which may be used to receive the code groups generated in the transmitter of FIG. 1. In FIG. 2, the pulse train generated in the transmitter of FIG. 1, after transmission over any desired transmission medium, is applied to input terminal 50 and hence to delay line distributor 51. Delay line 51 has a plurality of taps distributed therealong which delivers all the bits of each thirteen bit clock simultaneously to sample and hold gate 52. Sample and hold gate 52 is operated once at the end of each of these blocks to provide at its output the thirteen-digits of the block in parallel.

The input pulse train from input terminal 50 is also applied to clock recovery and framing circuit 53 which utilizes well-known techniques to recover the basic bit rate from the input pulse train and, moreover, to synchronize or frame the blocks. The output of clock recovery circuit 53 is applied to divider circuit 54 where this clock rate is divided by thirteen to provide an output lead 55 a series of clock pulses at the block rate. These pulses are applied to operate sample and hold gate 52 and simultaneously applied to the set input of bistable circuit 56 and, through delay line 57, to the reset input of bistable circuit 56.

Bistable circuit 56 is a circuit of the type which may be triggered to either one of two bistable states and remains in that state until an external trigger signal resets it to the other state. Thus an input signal to the "S" input triggers bistable circuit 56 to the "1" state, producing an output on output lead 58. A signal applied to the "R" input of bistable circuit 56 removes the output from output lead 58 by returning bistable circuit 56 to the other stable state.

The output pulses on lead 55 appear once every block length, i.e., once every thirteen bits of the input pulse train. These pulses are delayed in delay line 57 for an interval equal to one-half of the block length, six and one-half bit periods. It can therefore be seen that bistable circuit 56 is set to the "1" state at the beginning of each thirteen-bit block and is reset to the "0" state at the midpoint of each thirteen bit block. The output on lead 58 is therefore present only for the first one-half of each thirteen bit block.

Lead 58 is applied as one input to exclusive OR circuit 59. The other input to exclusive OR circuit 59 is applied by way of lead 60 and represents the first bit of each thirteen bit block and hence is the one digit position code generated in the transmitter of FIG. 1. Exclusive OR circuit 59 is a circuit of the well-known type which produces an output on output lead 61 when, and only when, the two inputs to this circuit are different. Such circuits have therefore been called anticoincident gates and are well known in the art.

From the arrangement of FIG. 2, it can be seen that the output of exclusive OR circuit 59 comprises a pulse for one-half of the thirteen bit block period and the absence of a pulse for the other half. If a pulse appears as the position code on lead 60, the last half of the block period contains the pulse. If, on the other hand, no pulse appears on lead 60, the pulse appears on lead 61 during the first half of the thirteen bit block period.

The output of exclusive OR circuit 59 is applied by way of lead 61 to gating circuit 62 and simultaneously to inverting circuit 63. Gate circuit 62, when operated by a pulse on lead 61, transfers the left-hand eight bits in sample and hold circuit 52 to a digital OR circuit 64. The output of inverting circuit 63 is simultaneously applied to gating circuits 65 and 66. Gating circuit 66 transfers the eight-digit differential code from retranslating circuit 75 to a digital adding circuit 67. The output of OR circuit 64 is also applied to adder circuit 67. The output of adder circuit 67 is applied to a sample and hold circuit 68, the output of which, in turn, is applied to gating circuit 65 and decoding circuit 69. The output of decoding circuit 69 is applied by way of gating circuit 70 to low-pass filter circuit 71 and thence to video output terminal 72. The output of divider circuit 54 appearing on lead 55 is applied to multiplier circuit 73 where it is multiplied by two and applied directly to gating circuit 70 and, through delay circuit 74, to sample and hold circuit 68.

In operation, the receiver of FIG. 2 decodes and reassembles the information in each thirteen bit block to form two successive amplitude modulated samples which are delivered to filter circuit 71. To this end, the output of exclusive OR circuit 59 on lead 61 operates gating circuit 62 either during the first half of the block period, if the eight-digit code represents the first sample of the two bit sample group, or during the second half of the block period, if the eight-digit code represents the second sample of the two-sample group. At the same time, the output of inverter circuit 63 operates gating circuits 65 and 66 during the opposite half of the block period. Adder circuit 67 therefore receives either the eight-digit code by way of gate 62 in OR circuit 64 along with no output from gate 66, or on the other hand, receives the output from sample and hold circuit 68 by way of gate circuit 65 and OR circuit 64 together with the differential code from gate 66.

In the first case, adder circuit 67 has no input from gate 66 to add to the eight-digit code and therefore delivers this eight-digit code directly to sample and hold circuit 68. In the latter situation, adder circuit 67 digitally combines the previous sample eight-digit code from sample and hold circuit 68 with the newly arrived differential code from retranslating circuit 75 and delivers the algebraic sum to sample and hold circuit 68. It will be noted that the delay provided in delay circuit 74 is equal to five and one-half bit periods and hence a new output is available from sample and hold circuit 68 one full bit position before the end of each sample period. Recovery circuit 69 operates in accordance with the well-known techniques to translate the eight bit binary input code into an analog signal level proportional to the input binary number. Gating circuit 70 derives an amplitude modulated pulse sample from this output. These pulses are delivered to filter circuit 71 where sampling frequencies are removed and the baseband video signal delivered to output terminal 72.

It can be seen that the receiving circuit of FIG. 2 operates to recover the basic analog information from the thirteen bit serial pulse blocks delivered to input terminal 50. In addition to providing regularly recurring fine grain full scale sample values, the receiver of FIG. 2 also cooperates with the transmitter of FIG. 1 to provide these full scale samples at precisely those sample intervals where a differential code is most likely to be in error.

The encoding system embodied in the apparatus of FIGS. 1 and 2 utilizes a block length of only two samples of the input video signal. This is the minimum possible block length for dual mode encoding systems in accordance with the present invention. It is, however, possible to utilize larger block lengths and, indeed, the band-saving advantages of the present invention are further enhanced by the use of such longer blocks. In the embodiment to be described in connection with FIGS. 3 and 4, the block length has been left unspecified. The actual block length used in any particular application depends basically on the probability of receiving more than one sample in each block producing excessively large differences, i.e., the number of edges per block length. This, in turn, depends upon the character of the visual information being transmitted. Written material, for example, produces a large number of abrupt brightness changes per unit area, while backgrounds produce relatively few such changes.

Figure 3:
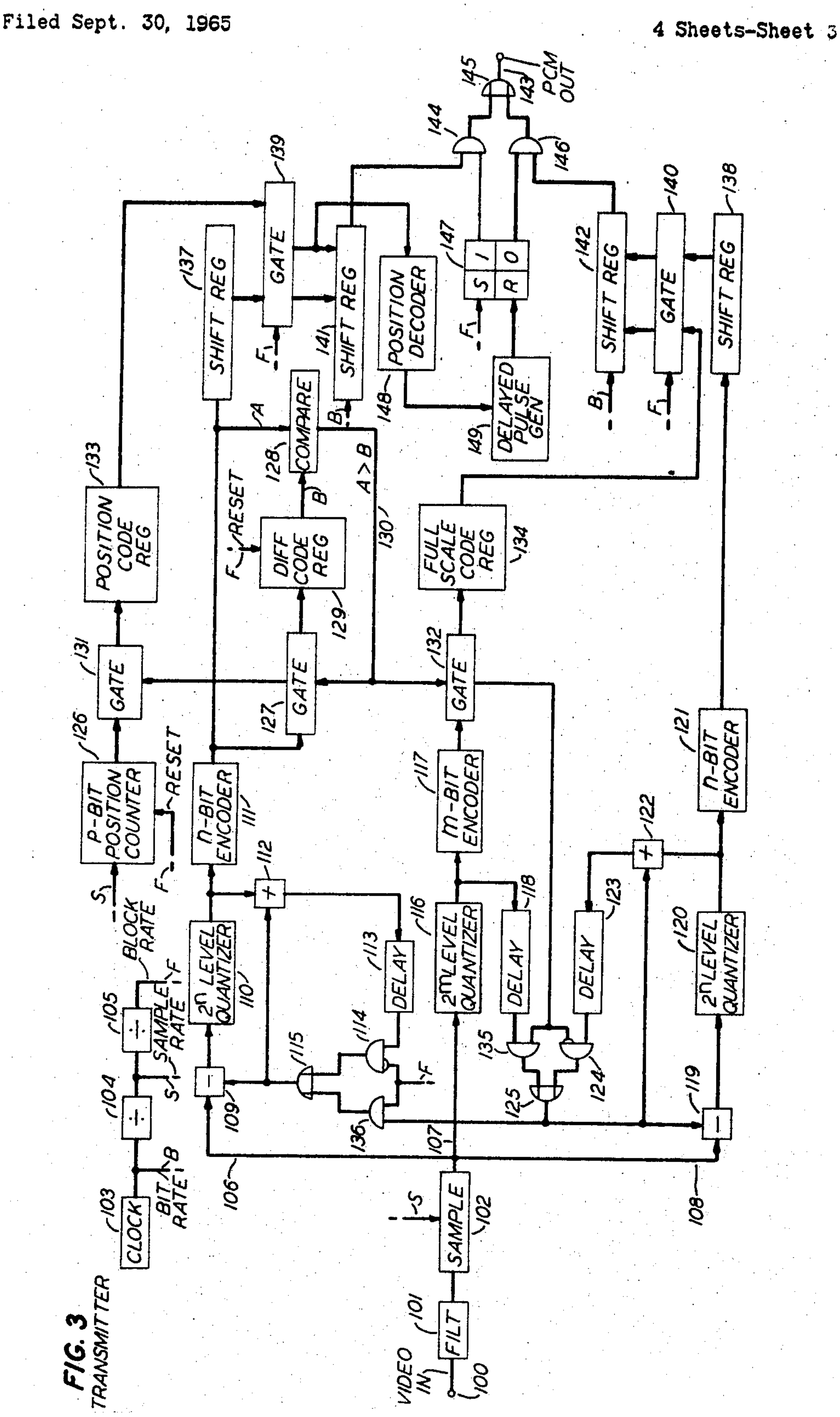
FIG. 3 is a detailed block diagram of another dual mode pulse code modulation transmitter in accordance with the present invention.
Figures 4, 5:
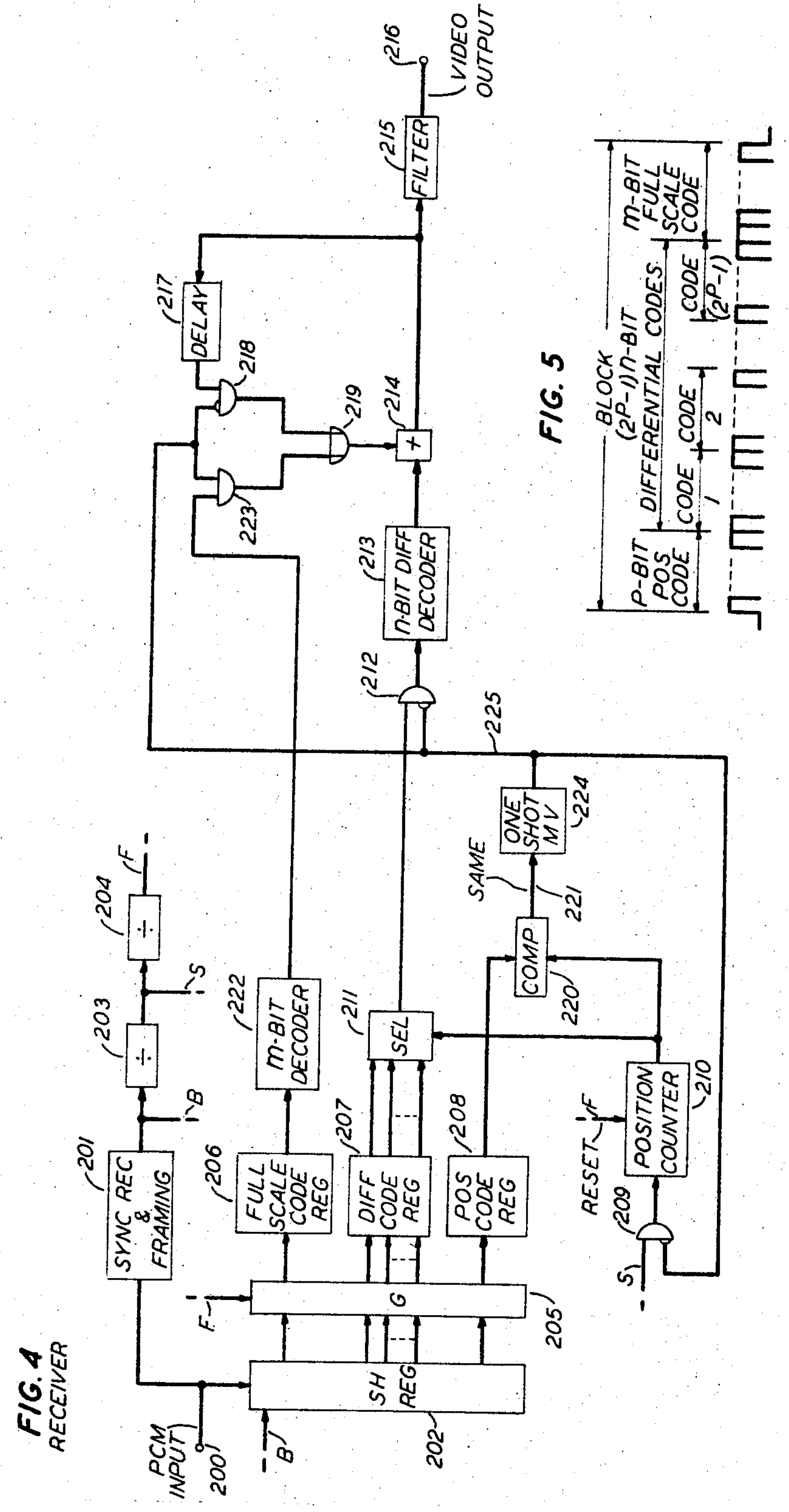
FIG. 4 is a detailed block diagram of a dual mode pulse code modulation receiver usable with the transmitter of FIG. 3.
FIG. 5 is a graphic representation of one block of an output pulse train such as might be provided by the transmitter of FIG. 3.

Turning first to FIG. 5, there is shown a graphic representation of one block of the output pulse train from the pulse code transmitter for FIG. 3. Assuming that each block length encompasses $2^p$ samples, a *p*-bit position code is adequate to represent uniquely each of these samples. Hence the block shown in FIG. 5 includes as the first element thereof a *p*-bit position code.

Since only one sample in each block is transmitted by a full scale code, the remaining samples, i.e. $(2^p-1)$ samples, are transmitted by differential codes. If it is assumed that an *n*-bit differential code is adequate, then, as shown in FIG. 5, the *p*-bit position code is followed by $(2^p-1)$ *n*-bit differential codes. Finally, the block is terminated by the full scale code which may be assumed to be an *m*-bit code.

Turning then to FIG. 3, there is shown a block diagram of a pulse code modulation transmitter, in accordance with the present invention, and which is suitable for generating coded blocks of video information of the form shown in FIG. 5. Baseband video information is delivered to input terminal 100 and is band-limited by low-pass filtering circuit 101. This band-limited video signal is applied to sampling circuit 102.

For convenience, the clock pulses are shown as being generated by a clock pulse source 103 followed by two divider circuits 104 and 105. Clock pulse source 103 provides clock pulses at the output bit rate. These pulses are divided by divider circuit 104 to provide clock pulses at the sampling rate. Finally, these sampling pulses are divided by divider circuit 105 to provide clock pulses at the block rate. These three rates are identified in FIG. 3 as B, S, and F, respectively.

The output of sampling circuit 102 is simultaneously applied to three leads 106, 107, and 108. Lead 106 applies these video samples to subtracting circuit 109. Subtracting circuit 109 receives analog samples at two of its inputs and provides the algebraic differences of these two analog values at its output. This output is applied to a $2^n$ level quantizer 110.

The output of quantizer 110 is simultaneously applied to encoding circuit 111 and adder circuit 112. Adder circuit 112 receives analog signal samples at two of its inputs and delivers the algebraic sum of these values at its output. This output is applied to delay circuit 113 having a delay exactly equal to the intersample interval, i.e., the period of clock pulses "S." The output of delay line 113 is applied by way of inhibit gate 114 and OR gate 115 to the remaining input of subtractor circuit 109 and to the remaining input of adder circuit 112.

It can be seen that, as long as inhibit gate 114 remains enabled, subtractor circuit 109, quantizer 110, adder circuit 112 and delay line 113, together with encoder 111, serve to generate differential codes representing the successive differences between the input samples. That is, each difference generated by subtractor circuit 109, after being quantized in quantizer 110, is added in adding circuit 112 to the sum of the previous differences and stored in delay line 113. The sum of previous differences may be thought of as the prediction of the next sample value and the difference between this prediction and the actual sample value as the error in prediction. It is the successive error signals which are quantized, encoded, and transmitted.

The samples on lead 107 are applied directly to quantizer 116 where they are quantized to one of $2^m$ levels and then applied to $m$-bit encoder 117. The output of quantizer 116 is also applied to delay line 118 which, like delay line 113, provides a delay equal to the intersample interval.

The samples delivered by lead 108 are applied to subtractor circuit 119, the output of which is applied to quantizer 120 which, like quantizer 110, quantizes this difference to one of $2^n$ levels. The quantized differences are delivered simultaneously to $n$-bit encoder 121 and adder circuit 122. The output adder circuit 122 is connected to delay line 123 which, like delay lines 113 and 118, provides a delay equal to the sampling period. The output of delay line 123 is applied by way of inhibit gate 124 and OR gate 125 to the remaining input of subtractor 119 and to the remaining input of adder circuit 122.

It can be seen that the samples delivered by leads 106 and 108 are processed in substantially identical manners. As will be seen, the only differences between the codes provided by encoder 111 and those provided by encoder 121 are the predictions used to generate the error signals. These predictions, delivered by OR gate 115 and OR gate 125, are corrected on occasion to prevent excessively large error signals from being delivered to quantizer 110 and 120. The exact manner in which these corrections are made will be taken up hereinafter.

A position counter 126 is provided to count the positions of the samples and to provide this count as a binary number on its output leads. To this end, "S" clock pulses are applied to advance the counter 126 and "F" clock pulses used to reset the counter. As previously noted, the position codes generated by counter 126 are $p$-bit codes.

The output of $n$ bit encoder 111 is simultaneously applied to a gating circuit 127 and to a compare circuit 128. Assume for the moment that the absolute magnitude of the differential code in register 129 is less than that at the output of encoder 111. Compare circuit 128 then operates to suppress the production of an output pulse on lead 130. It will be noted that a digital comparison is required. If the absolute magnitude of input code from encoder 111 is larger, an output pulse is produced and is applied by way of lead 130, to gating circuits 127, 131 and 132. Gate 131 transfers the position code then appearing at the output of counter circuit 126 into position code register 133. Since this position code is generated simultaneously with the obtaining of the sample represented by the differential code from encoder 111, the code stored in register 123 identifies the sample producing the greater difference.

Gate 132, in operating, transfers the full scale $m$-bit code from $m$-bit encoder 117 into the full scale code register 134. This code is a full scale representation of the amplitude of the single sample identified by the position code in register 133. It will be noted that the signal on lead 130 disables inhibit gate 124 and enables AND gate 135 to substitute the output of delay line 118 (from quantizer 116) for the output of delay line 123 at the inputs of subtractor circuit 119 and adder circuit 122.

As successive samples are delivered by way of sampling gate 102 to the circuit of FIG. 3, the compare circuit 128 recognizes when each new error signal exceeds the previous highest error signal. In response to the output of compare circuit 128, the differential code for this greater error signal is stored in register 129. The position code identifying the corresponding sample is stored in position code register 133, and the full scale representation of the corresponding sample is stored in register 134. It can be seen that, at the end of each block of input samples, the sample which produces the greatest difference or error signal in the block is represented in register 129 by a differential code, in register 134 by a full scale code, and in register 133 by a position code. Simultaneously, the differential codes being supplied by encoder 121 are calculated from the successively greater differences as noted by compare circuit 128. That is, the output of OR circuit 125 provides the outputs of quantizer 116 corresponding to the successively higher error signals until, finally, at the end of the block, the greatest error signal has caused the full scale quantized level of the corresponding sample to be utilized by encoder 121 to provide differential codes. The differential codes supplied by encoder 111, on the other hand, are calculated from the accumulated differences from the beginning of the block. This accumulated difference is corrected at the end of each block interval by applying the "F" clock pulse to AND gate 136 and inhibit gate 114. In this way, the outputs of encoders 111 and 121 are made to correspond at the beginning of each block of samples.

The output of encoder 111 is stored in shift register 137 as it is generated. Similarly, the output of encoder 121 is stored in shift register 138 as it is generated. At the end of the block of samples, as was previously noted, the position code for the sample producing the greatest error signal is stored in register 133. The full scale code representation of the sample producing the greatest error signal is stored in shift register 134. Shift register 137 includes differential codes for all of the block samples calculated on the basis of the corrected sum inserted by AND gate 136 at the end of the previous block. Shift register 138 includes differential codes for all of the samples of the block, but calculated on the basis of successive predictions corresponding to samples which produce successively higher error signals. These successive predictions are provided by way of AND gate 135.

At the end of the block interval, an "F" clock pulse operates gates 139 and 140. Gate 139 transfers the contents of shift register 137 and the contents of position code register 133 into shift register 141. Simultaneously, the operation of gate 140 transfers the contents of full scale code register 134 and shift register 138 into shift register 142. Shift registers 141 and 142 are out-pulsed by "B" clock pulses, i.e., at the output bit rate. Shift register 141 is connected to output terminal 143 by way of AND gate 144 and OR gate 145. Shift register 142, on the other hand, is connected to output terminal 143 by way of AND gate 146 and OR gate 145. AND gates 144 and 146 are enabled by the outputs of bistable circuit 147.

Bistable circuit 147 is a circuit of the type shown in FIG. 2 which provides an output on its "1" output lead when triggered by a signal to its "S" input. This output is removed and an output supplied on its "0" output lead upon the application of a triggering signal to the "R" input. Bistable circuit 147 is set to its "1" state by an "F" clock pulse applied to the "S" input. The contents of position code register 133 are transferred by gate circuit 139 to position decoder 148. Position decoder 148 translates the *p*-bit position code into an analog signal proportional to the value of the *p*-code. This analog signal is applied to delayed pulse generator 149 which generates a pulse after an interval proportional to the magnitude of its input signal. It can be seen that the pulse output from delayed pulse generator 149 occurs precisely at a time corresponding to the sampling time of the sample identified by the contents of position code register 133.

It can be seen that the shift register 141 is connected through OR gate 145 to output terminal 143 as long as bistable circuit 147 remains in its "1" state. When reset to its "0" state, bistable circuit 147 disconnects shift register 141 from output terminal 143 and substitutes shift register 142. It will be recalled that shift register 141 contains, in its right-hand positions, the position code from register 133. This position code is followed by differential codes generated in encoder 111. The position code and the differential codes ar shifted out of register 141 to output terminal 143 up to the position corresponding to the position code. At this time, shift register 141 is disconnected and shift register 142 connected to output terminal 143. This arrangement is necessary since the differential codes preceding the full scale code are calculated on the basis of accumulated sums from the beginning of the sample block. The differential codes following the full scale code, on the other hand, are calculated on the basis of that full scale code. The former differential codes are derived from shift register 137 while the latter differential codes are derived from shift register 138. Shift register 142 also includes in its left-hand positions the *m*-bit full scale code representing the magnitude of the sample creating the greatest error signals. This format is precisely that illustrated graphically in FIG. 5.

It will be noted that the transmitter of FIG. 3 can be implemented to utilize sample blocks of any desired length and differential codes and full scale codes of any desired numbers of digits. As previously noted, the numbers chosen for these implementations will depend directly upon the character of the video information being transmitted. As was suggested in connection with FIGS. 1 and 2, *m* could be eight and *n* four. While these numbers are useful in some applications, they are by no means restrictive and, should not be taken in a limiting manner.

Turning then to FIG. 4, there is shown a block diagram of a pulse code modulation receiver useful in combination with the transmitter of FIG. 3. The serial pulse trains provided by the transmitter of FIG. 3 and illustrated graphically in FIG. 3 are applied to input terminal 200. This input train is simultaneously applied to synchronizing signal recovery and framing circuit 201 and shift register 202. Sync recovery and framing circuit 201 recovers the basic bit rate from the input pulse train and, moreover, derives the information necessary to frame the successive blocks of information. The output pulse train from circuit 201 is at the bit rate and is applied to divider circuit 203 to provide at the output thereof a clock pulse train at the sampling rate. This output pulse train, in turn, is applied to divider circuit 204 which provides at its output clock pulses at the block rate. These various clock pulses are utilized as will be hereinafter described to time the various operations in the receiver of FIG. 4.

Serial pulses are shifted into shift register 202 until the entire block is in register 202. At this time, gating circuit 205 is operated to transfer the contents of shift register 202 into registers 206, 207 and 208. Register 206 registers the full scale code arrived at the end of the block. Register 207 stores the $(2^p-1)$ *n*-bit differential codes. Register 208 stores the *p*-bit position code. Thus, the entire block of pulses is stored in the three registers 206, 207, and 208. Shift register 202 is then free to receive the next succeeding block.

Clock pulses at the sampling rate are applied by way of inhibit gate 209 to position counter circuit 210. Like the counter 126 in FIG. 3, counter 210 counts in succession the sample positions within the block. The output of counter 210 is applied to selector circuit 211.

Selector circuit 211 is a circuit of the well-known type which successively connects each of a plurality of inputs to a single output under the control of binary codes applied to control inputs. Selector 211 may comprise a combination of logical gating circuits interconnected to perform the described function. Since such circuits are well known in the art, selector 211 will not be further described here.

The output of selector circuit 211 is applied by way of inhibit gate 212 to decoding circuit 213. Decoding circuit 213 translates the *n*-bit differential codes at its input to analog signals representing the value of the input code. These analog values are applied to analog adding circuit 214. The output of adding circuit 214, in turn, is applied by way of filter circuit 215 to video output terminal 216 and to the input of delay line 217. Delay line 217 provides a delay equal to the period between sample pulses and its output is applied by way of inhibit gate 218 and OR gate 219 to the remaining input of adding circuit 214. It can be seen that adding circuit 214 and delay line 217 serve to accumulate the successive differential values supplied by decoder 213. This accumulation of differences, after being filtered in filter circuit 215, forms the video output signal.

The output of position counter circuit 210 is also applied to digital compare circuit 220 to which the output of position code register 208 is also applied. Compare circuit 220 provides a digit-by-digit comparison of the two binary codes present at its inputs and provides on output lead 221 a pulse when these inputs are identical. A simple coincidence gate for each of the digits of the input codes, followed by coincidence gate to which the outputs of all the digit coincidence gates are applied, could be used as compare circuit 220. It will be noted that the output pulse from compare circuit 220 appears during the sampling interval corresponding to the sample producing the greatest difference in the block. As will be recalled in connection with FIG. 3, at precisely this time a full scale code must be substituted for the differential code. To this end, the full scale code in register 206 is applied to *m*-bit decoding circuit 222 where it is converted into an analog value. This analog value is applied to adding circuit 214 by way of AND gate 223 and OR gate 219 when AND gate 223 is enabled by a pulse on lead 225.

The output of compare circuit 220 is applied to monostable multivibrator 224. Monostable multivibrator 224 produces an output pulse on lead 225 having a duration equal to one sampling interval. This output on lead 225 disables inhibit gate 212 to prevent the differential code then available from selector 211 from being applied to decoder circuit 213. Hence, at the same time the full scale code sample is applied to adding circuit 214, the output of encoder circuit 213 is removed to insure that this full scale sample is not modified by a differential value.

In order to avoid the loss of this differential code, however, the output of monostable multivibrator 224 on lead 225 is also applied to disable inhibit gate 209. The output pulse from multivibrator 224 is of just sufficient length to block one clock pulse at the sampling rate as applied to inhibit gate 209. Following the sample period encompassed by the output of monostable multivibrator 224, the differential code provided by selector 211 is allowed to pass inhibit gate 212 and be applied to decoder circuit 213. This differential code is added in adding circuit 214 to the full scale code value supplied by decoder circuit 222 in the previous sample interval. Thereafter, position counter 210 is allowed to advance as before, providing new differential codes at the output of selector 211. This process is continued until the end of the block period at which time position counter 210 is reset by a clock pulse at the block rate. At the same time, a new block is gated from shift register 202 into registers 206, 207, and 208 and the process is repeated.

It can be seen that the receiving circuit of FIG. 4 operates to receive blocks of digital information in the form shown in FIG. 5 and to translate these blocks into analog video signals correspondings to the video signals at the input of the transmitter of FIG. 3. It is to be understood that many of the connections shown in FIGS. 3 and 4 as single leads in fact represent cables carrying a plurality of binary digit representations in parallel. Similarly, gating operations on such cables are illustrated by single gates, whereas, in fact, such gates must be duplicated for each of the digit conductors in the cable. Finally, delay times due to the finite delays inherent in the various equipment units in FIGS. 3 and 4 have been ignored, and these equipments have been assumed to operate with essentially no delay. In any practical embodiment, of course, small compensating delays are required to insure the synchronous arrival of information from various sources. Such delays can be readily provided by those skilled in the art to conform to the actual equipment used to implement the blocks of FIGS. 3 and 4.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A video transmission system comprising a source of video signals, means for obtaining regularly recurring samples of said video signal arranged in successive equal length blocks, means for deriving the difference between each said sample and the accumulated sum of previously derived differences, means for identifying the position of that one sample producing the largest said difference in each said block, and means for transmitting said identified position, the successive differences and said one sample.

2. The video transmission system according to claim 1 further including means to encode said differences in a code having a given number of digits, and means for encoding said one sample in a code having a number of digits greater than said given number.

3. A signal transmission system comprising a signal source, means for deriving groups of regularly recurring samples of said signal, means for transmitting differential representations of all of said samples in each said group except that one sample producing the greatest difference, means for transmitting a full scale representation of said one sample, and means for transmitting the position of said one sample in said group.

4. The signal transmission system according to claim 3 further comprising means for encoding said representations in permuted pulse code groups.

5. The signal transmission system according to claim 4 further comprising means for deriving the difference between each said sample and the accumulated sum of previously generated differences.

6. The signal transmission system according to claim 4 further including a transmission medium, means for applying said transmitted representations to said medium, and means remotely coupled to said medium for reconstructing said signals from said representations.

7. A television transmission system comprising means for generating a sequence of video signal samples from a television signal to be transmitted, said sequence of samples being divided into successive equal-length groups of samples, means for generating the difference between each said sample and previous sample values, means for determining one sample in each said group producing the greatest said difference for that group, means for encoding each said one sample to a first degree of fineness of quantization, means for encoding all differences between samples except said one sample to a second degree of fineness of quantization, means for encoding the position of each said one sample within its respective group, and means for sequentially transmitting all of said codes.

8. The television transmission system according to claim 7 wherein said samples are all encoded to said first degree of fineness of quantization, said difference generating means comprising means for digitally subtracting said codes, and means for translating said subtracted code differences into another code having a fewer number of digits.

9. The television transmission system according to claim 7 wherein an error signal is generated for each said sample, said error signal comprising the difference between each said sample and the accumulated sum of previous error signals.

10. A television transmission system comprising a source of video signals, means for generating a sequence of samples from said signals, means for encoding such said sample into a pulse permutation code of a fixed number of digits, means for subtracting successive ones of said coded samples from the previous coded sample, means for transmitting that sample producing the greatest difference, means for translating the coded differences into a differential pulse permutation code having a fewer number of digits than said fixed number, and means for transmitting said differential codes.

11. The television transmission system according to claim 10 further including means for dividing said samples into equal sized groups, means for transmitting only one of said codes of a fixed number of digits for each said group, and means for transmitting said differential codes for all of the other samples in each said group.

12. The television transmission system according to claim 11 wherein each said group comprises two successive samples, and means for transmitting one digit identifying the position of said one code in said group.

13. A television transmission system comprising a source of video signals, means for generating a sequence of samples from said signals, means for generating an error signal for each said sample representing the difference between that sample and the predicted value of that sample, each said predicted value representing the accumulated sum of previously generated error signals, means for encoding that sample producing the greatest error signal into a first code of finely quantized values, means for encoding the error signals for all other samples into a second code of less finely quantized values, and means for transmitting said first and second codes.

14. The television transmission system according to claim 13 further including means for dividing said samples into equal sized groups, means for transmitting only one first code for each said group, and means for transmitting said second codes for all of the other samples in each said group.

15. The television transmission system according to claim 14 further including means for generating a code identifying the position of said first code in each said group, and means for transmitting said position code.

References Cited

UNITED STATES PATENTS

| | | | |
|---|---|---|---|
| 3,071,727 | 1/1963 | Kitsopoulos | 325—44 |
| 3,090,008 | 5/1963 | Mounts | 325—44 |

ROBERT L. GRIFFIN, *Primary Examiner.*

W. S. FROMMER, *Assistant Examiner.*